N. WOYEVODSKY.
AIRCRAFT.
APPLICATION FILED MAY 12, 1919.
1,391,355.
Patented Sept. 20, 1921.
5 SHEETS—SHEET 3.
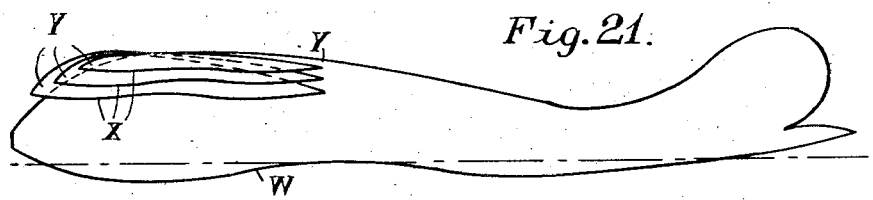
Fig. 21.
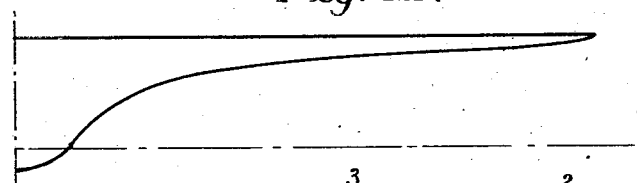
Fig. 22.
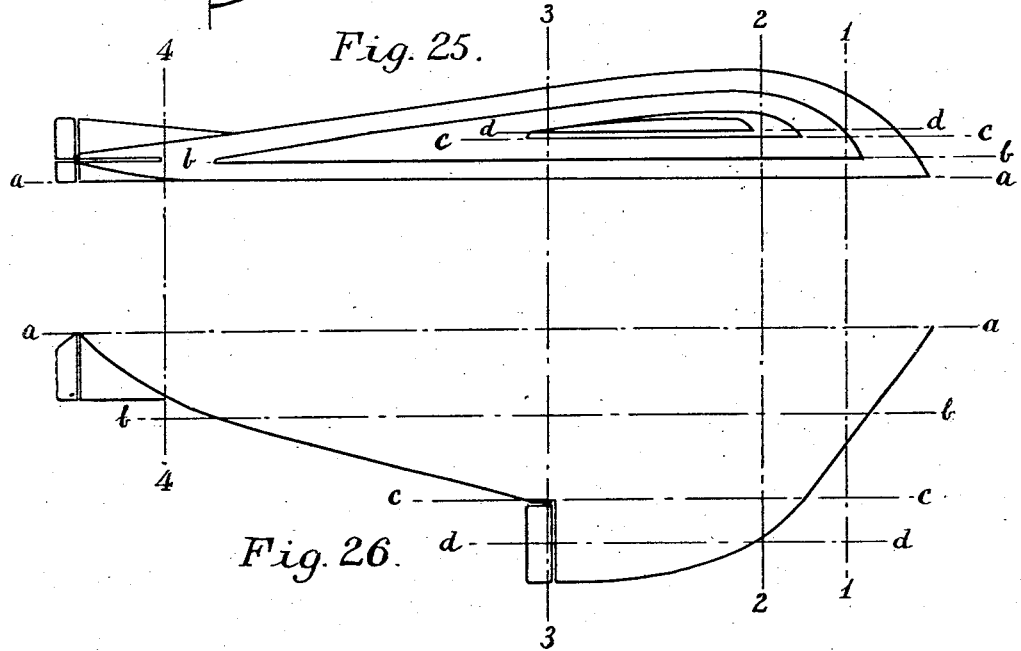
Fig. 25.
Fig. 26.
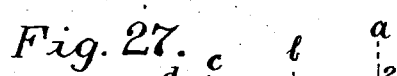
Fig. 27.
Witnesses
G. B. Wright
K. B. Hughes
Inventor
Nicolas Woyevodsky
by
Sturtevant Mason
attorneys

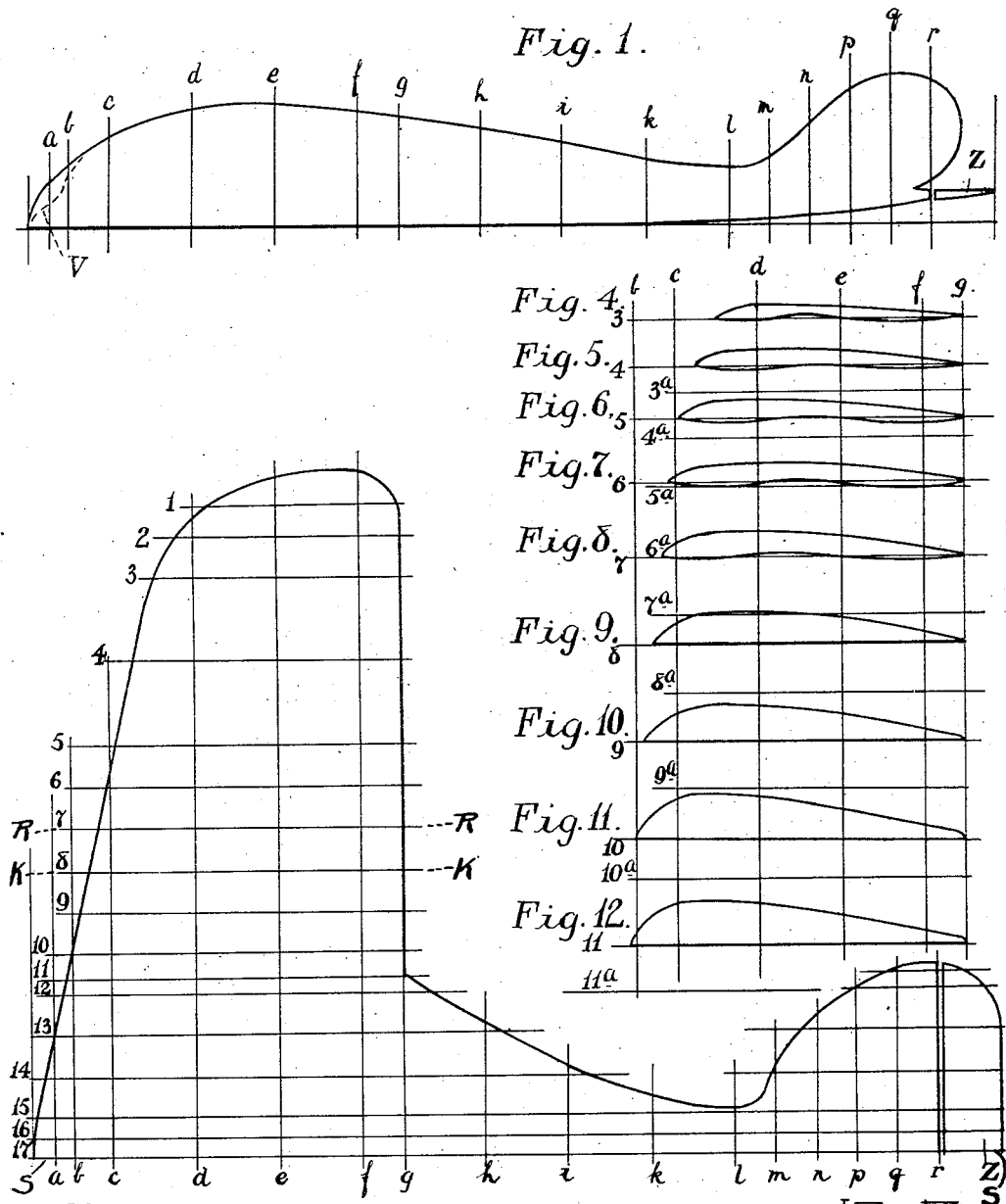

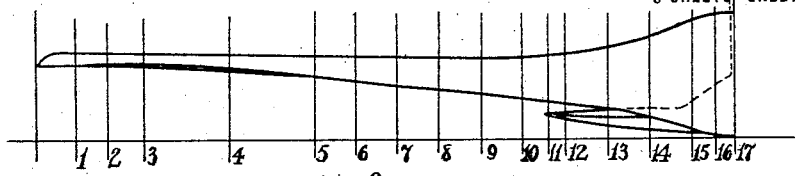
Fig. 3.
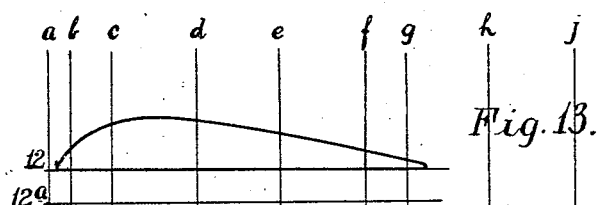
Fig. 13. Fig. 18.
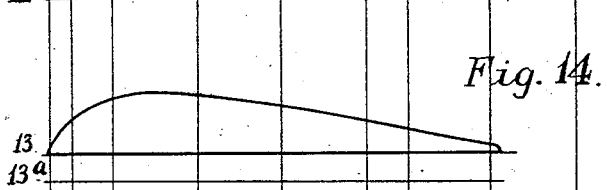
Fig. 14. Fig. 19.
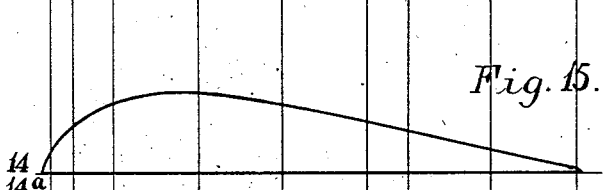
Fig. 15. Fig. 20.
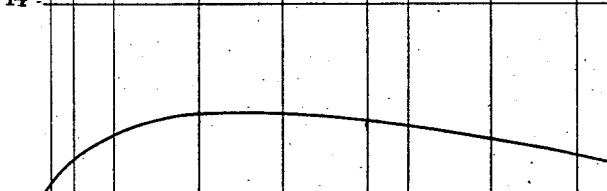
Fig. 16.
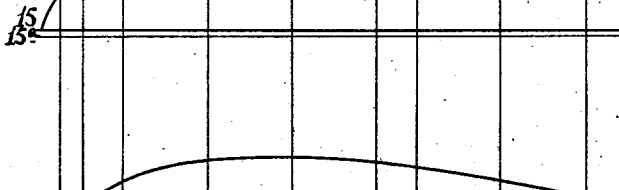
Fig. 17.
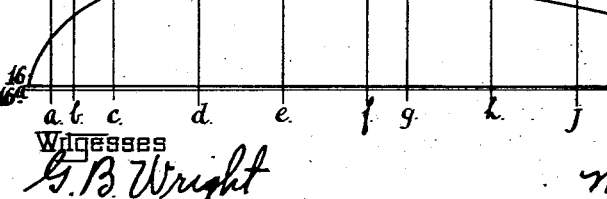

N. WOYEVODSKY.
AIRCRAFT.
APPLICATION FILED MAY 12, 1919.

1,391,355.

Patented Sept. 20, 1921.
5 SHEETS—SHEET 5.

UNITED STATES PATENT OFFICE.

NICOLAS WOYEVODSKY, OF LONDON, ENGLAND.

AIRCRAFT.

1,391,355.  Specification of Letters Patent.  Patented Sept. 20, 1921.

Application filed May 12, 1919. Serial No. 296,700.

*To all whom it may concern:*

Be it known that I, NICOLAS WOYEVODSKY, a Russian subject, residing at London, in the county of Middlesex and Kingdom of England, have invented certain new and useful Improvements in and Relating to Aircraft, for which I have filed application in England on March 2nd, 1918, No. 3677, of which the following is a specification.

The present invention relates to improvements in aircraft and the like craft of the type formed of parts of pterygoid aerofoil section deep enough to inclose the structural members necessary for their support and parts such as engines, cabins and the like.

According to the present invention an aircraft is formed of parts of pterygoid aerofoil section increasing proportionately in depth and length, while maintaining a constant contour, from one longitudinal section line of the aircraft to another.

The invention is more particularly described with reference to the accompanying diagrammatic drawings (not to scale) in which:

Figure 1 is a longitudinal median line cross sectional view of the aircraft,

Fig. 2 is a corresponding semi-plan view,

Fig. 3 is a semi-front view,

Figs. 4 to 12 are wing sections,

Figs. 13 to 17 are body sections, while

Figs. 18 to 20 are tail sections,

Figs. 21 and 22 are views of a modification,

Figs. 25, 26 and 27 are views of a further modified form in end view half plan and half front view respectively.

Figure 23:
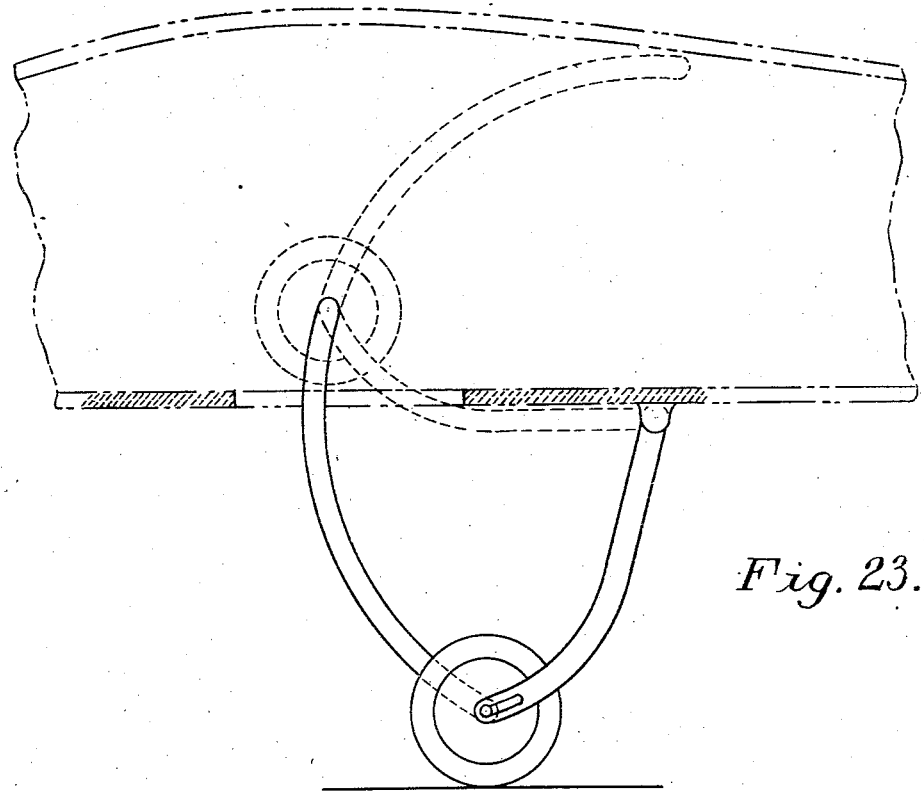
Figs. 23 and 24 are views of a suitable landing carriage.

As will be seen from the drawings the aircraft is throughout of pterygoid aerofoil section which is deep enough to inclose all necessary operating structures and load and also to allow of all structural girders for the support of the aerofoil elements to be arranged wholly within these.

As will be seen from Figs. 4 to 8 the wing sections while maintaining a pterygoid aerofoil section of constant contour, increase gradually in length and depth, up to the longitudinal section line K.K. and for instance the section adopted may be the well known R.A.F. 15. Then the wing sections as seen from Figs. 9 to 17 while maintaining a constant contour gradually increase in length and depth from the line R.R. to the longitudinal line S.S. and a different section for instance the Drezwiecki section may be used; it is particularly to be noticed that there is no line of interruption between wing and body and that the cross section is constantly increasing toward the central axis of the machine: between the longitudinal section lines K.K. and R.R. which zone is kept as small as possible. A constant section is adopted which will expand uniformly in length and depth, and will merge from, in the instances taken, the R.A.F. 15 section to the Drezwiecki section.

The body sections Figs. 13 to 17 are for the purposes of explanation termed body sections while the sections of Figs. 7 to 12 are called winged sections but they are all pterygoidal, that is to say, they are all useful supporting surfaces and each is similarly loaded.

It will be seen that by giving the body part so called, a triangular shape the depth of the aerofoil section may be considerably consequently deepened which is useful to inclose loads such as the passengers and engines and so forth.

It is obvious that the same pterygoid aerofoil sectional contour may be adopted for the complete aircraft from the wing tip to the central axis of the body part, for instance a Drezwiecki section may be taken. These sections are, however, only quoted by way of example.

It will also be noticed that the tail planes, are of ichthyoid section that is to say they do not act necessarily as lifting or supporting elements; they are grafted onto the body or main aircraft portion within the predetermined sectional contour of this portion the line of junction being smoothed away slightly as shown.

This arrangement will be particularly evident from Sheet 2 of the drawings where Figs. 18 to 20 and Figs. 16 and 17 show the tail planes, preferably of stream line or ichthyoidal cross section merging into the body part within the pterygoid aerofoil section of this latter.

The aircraft wing and body section may be developed about the same axis, that is to say, the axis through the centers of pressure along the aerofoil sections may follow a smooth line, usually a straight line where the sectional contour is unchanged; or as shown in the modifications shown in Figs. 21 and 22 in side view and front view respectively, the top of the planes may be along a straight horizontal line, that is to say a line at right angles to the vertical axis of the machine or even with dihedral and the wing sections are dropped or developed therefrom.

This is particularly desirable in the case of a seaplane where it is necessary for the wing surfaces to be supported as far above the water as possible when the aircraft is at rest thereon.

Again referring to Figs. 21 and 22 a further modification may be adopted in that the contour line of the top part of the aerofoil Y is of a certain accepted section say R.A.F. 15, while the lower contour line is of another accepted section say the bottom contour line of the R.A.F. 16 section.

By taking a section such as the R.A.F. 16 by way of example reëntrant parts W are presented which are particularly suitable for operating on a water surface thereby forming the well known hydroplane effect of reduced resistance at the higher speeds of propulsion over the water.

It will be obvious that certain modifications of the above arrangements can be made and be within the scope of this invention. For instance a separate float element or elements preferably also of aerofoil cross section throughout can be mounted by the usual cross stays and struts beneath the aircraft.

The inclosing surfaces may be of fabric suitably treated as hitherto, or may be of sheet material such as ply wood, throughout or in part.

Figure 24:
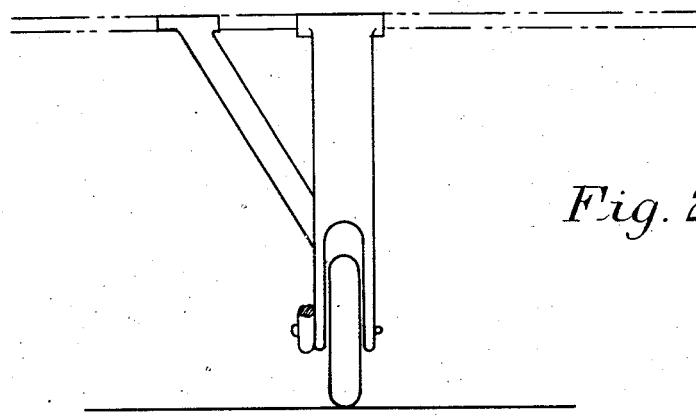
Figure 28:
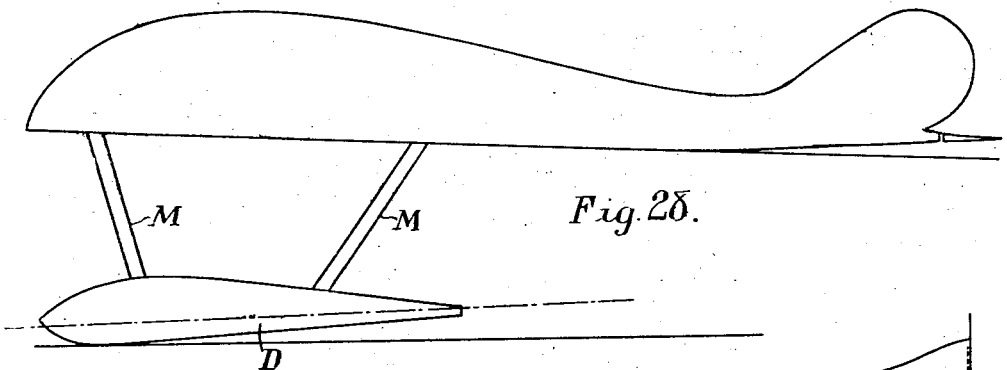
Fig. 28 is a diagrammatic side elevation of an aircraft with separate float.

In constructions where landing gear is used this is preferably arranged to collapse within the aircraft during flight as shown in Figs. 23 and 24 in elevational side and front views respectively.

Figure 29:
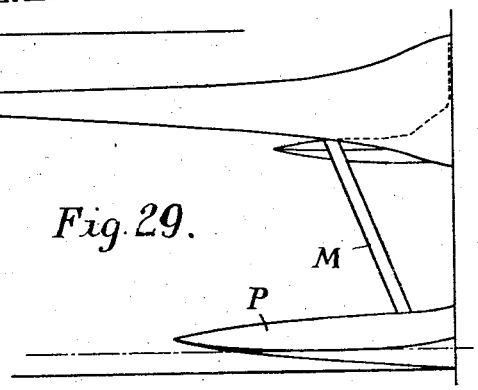
Fig. 29 is a corresponding half front elevation.
Figure 30:
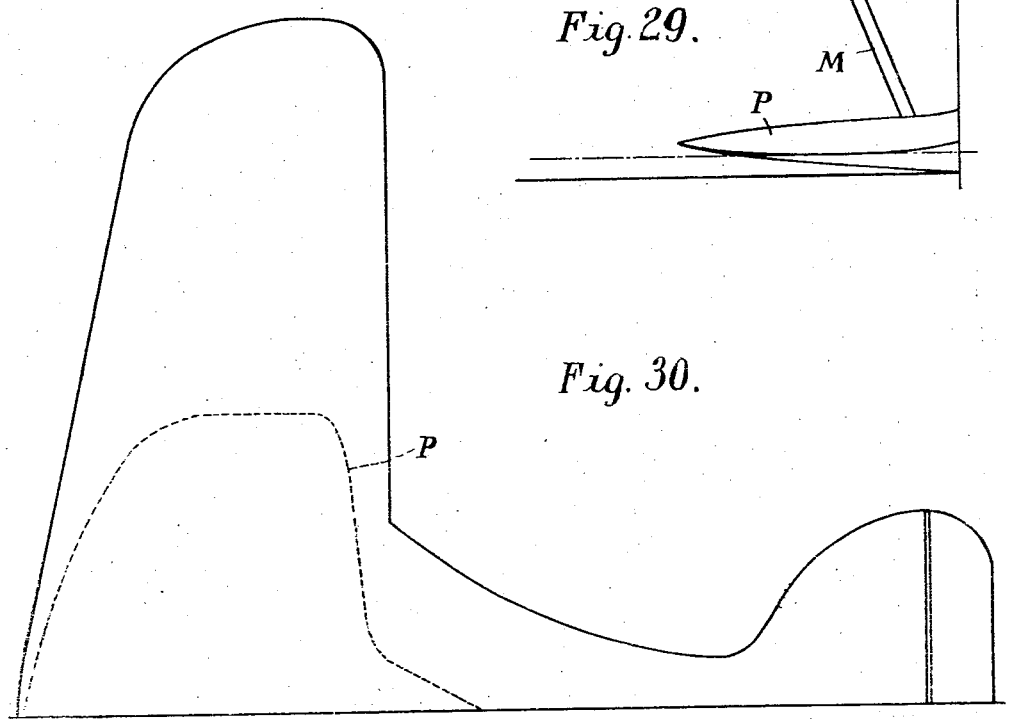
Fig. 30 is a corresponding half plan view.

Figs. 25-27 show views of a lighter-than-air craft according to this invention, where the above various arrangements of contour to the pterygoid aerofoil sections will also apply. The inclosure for the gas content may for instance be made wholly of fabric internally supported if desired, or partly of fabric and partly of wood or other material. If desired a float such as P. Figs. 29-30 may be provided itself of pterygoid aerofoil section and carried on the aircraft by struts M.

I declare that what I claim is:—

1. A craft formed throughout of pterygoid aerofoil cross section inclosing all structural parts, in which the aerofoil section while maintaining a constant contour increases constantly in length from one longitudinal section of the aircraft to another.

2. A craft formed of a body element and wing elements merging therefrom, all of pterygoid aerofoil section and varying gradually in depth and length, to maintain a constant contour, from one bounding edge to another whereby as the body element is longer than the length of the wings so also is it proportionately deeper.

3. A craft formed throughout of pterygoid aerofoil cross section constant in contour but variable in depth and consequently length and having the center of pressure of all sections along a straight line.

4. A craft formed throughout of pterygoid aerofoil cross section constant in contour but variable in depth and consequently length, the upper point of each section being on a straight line.

5. A craft formed throughout of pterygoid aerofoil cross section constant in contour but variable in depth and consequently length, the upper point of each section being on a straight line at right angles to the vertical axis of the aircraft.

6. An aircraft formed throughout of pterygoid aerofoil cross section inclosing all structural parts, in which the aerofoil section while maintaining a constant contour increases constantly in length from one longitudinal section of the aircraft to another.

7. An aircraft formed of a body element and wing elements merging therefrom, all of pterygoid aerofoil section and varying gradually in depth and length, to maintain a constant contour, from one bounding edge to another whereby as the body element is longer than the length of the wings so also is it proportionately deeper.

8. An aircraft formed throughout of pterygoid aerofoil cross section constant in contour but variable in depth and consequently length, the upper point of each section being on a straight line.

9. An aircraft formed throughout of pterygoid aerofoil cross section inclosing all structural parts, in which the aerofoil section while maintaining a constant contour increases constantly in length from one longitudinal section of the aircraft to another, and tail planes of ichthyoid cross section.

10. An aircraft formed of a body element and wing elements merging therefrom, all of pterygoid aerofoil section and varying gradually in depth and length, to maintain a constant contour, from one bounding edge to another whereby as the body element is longer than the length of the wings so also is it proportionately deeper, and tail planes of ichthyoid cross section.

11. An aircraft formed throughout of pterygoid aerofoil cross section constant in contour but variable in depth and consequently length, the upper point of each section being on a straight line, and tail planes of ichthyoid cross section.

12. An aircraft formed throughout of pterygoid aerofoil cross section inclosing all structural parts, in which the aerofoil section while maintaining a constant contour increases constantly in length from one longitudinal section of the aircraft to another, and tail planes of ichthyoid cross section intersecting part of the pterygoid aircraft section.

13. An aircraft formed of a body element and wing elements merging therefrom, all of pterygoid aerofoil section and varying gradually in depth and length, to maintain a constant contour, from one bounding edge to another whereby as the body element is longer than the length of the wings so also is it proportionately deeper, and tail planes of ichthyoid cross section intersecting part of the pterygoid aircraft section.

14. An aircraft formed throughout of pterygoid aerofoil cross section constant in contour but variable in depth and consequently length, the upper point of each section being on a straight line, and tail planes of ichthyoid cross section intersecting part of the pterygoid aircraft section.

15. A lighter than air aircraft formed throughout of pterygoid aerofoil cross section inclosing all structural parts, in which the aerofoil section while maintaining a constant contour increases constantly in length from one longitudinal section of the aircraft to another.

16. A lighter than air aircraft formed of a body element and wing elements merging therefrom, all of pterygoid aerofoil section and varying gradually in depth and length, to maintain a constant contour, from one bounding edge to another whereby as the body element is longer than the length of the wings so also is it proportionately deeper.

17. A lighter than air aircraft formed throughout of pterygoid aerofoil cross section constant in contour but variable in depth and consequently length, the upper point of each section being on a straight line.

18. As an article of manufacture a gas envelop of pterygoid aerofoil cross section maintaining a constant contour increasing constantly in length from one longitudinal section line to another.

In witness whereof, I have hereunto signed my name this 17th day of April 1919, in the presence of subscribing witnesses.

NICOLAS WOYEVODSKY.

Witnesses:
GEORGE CHARLES ALEXANDER WILKINS,
AUGUST CRELLE,
D. GRANT STRACHAN,
COLONEL MIRONOFF.